(12) United States Patent
Liang et al.

(10) Patent No.: US 8,486,296 B2
(45) Date of Patent: Jul. 16, 2013

(54) BATTERY GRADE CATHODE COATING FORMULATION

(75) Inventors: Guoxian Liang, St-Hyacinthe (CA); Jasmin Dufour, Lemoyne (CA)

(73) Assignee: Clariant (Canada) Inc., Toronto (ON) (CA)

( * ) Notice: Subject to any disclaimer, the term of this patent is extended or adjusted under 35 U.S.C. 154(b) by 0 days.

(21) Appl. No.: 13/184,179

(22) Filed: Jul. 15, 2011

(65) Prior Publication Data

US 2012/0025149 A1 Feb. 2, 2012

Related U.S. Application Data

(60) Provisional application No. 61/364,492, filed on Jul. 15, 2010.

(51) Int. Cl.
*H01M 4/88* (2006.01)

(52) U.S. Cl.
USPC ........... 252/182.1; 252/506; 252/519.14; 423/306; 427/212; 428/402; 428/403; 429/218.1; 429/221; 429/224; 429/231.5; 429/326

(58) Field of Classification Search
USPC ... 252/506, 182.1, 519.14; 427/212; 428/403, 428/402; 429/218.1, 221, 231.95, 326, 224, 429/231.5; 423/306
See application file for complete search history.

(56) References Cited

U.S. PATENT DOCUMENTS

| | | | |
|---|---|---|---|
| 5,580,686 A | 12/1996 | Shi et al. | |
| 5,910,382 A | 6/1999 | Goodenough et al. | |
| 6,844,114 B2 | 1/2005 | Gauthier et al. | |
| 6,855,273 B2 | 2/2005 | Ravet et al. | |
| 6,962,666 B2 | 11/2005 | Ravet et al. | |
| 7,285,260 B2 | 10/2007 | Armand et al. | |
| 7,344,659 B2 | 3/2008 | Ravet et al. | |
| 7,457,018 B2 | 11/2008 | Armand et al. | |
| 7,534,408 B2 | 5/2009 | Gauthier et al. | |
| 7,601,318 B2 | 10/2009 | Armand et al. | |
| 7,807,121 B2 | 10/2010 | Nuspl et al. | |
| 7,815,819 B2 | 10/2010 | Ravet et al. | |
| 2002/0195591 A1 | 12/2002 | Ravet et al. | |
| 2004/0157126 A1 | 8/2004 | Belharouak et al. | |
| 2006/0147809 A1* | 7/2006 | Amine et al. | 429/326 |
| 2007/0054187 A1 | 3/2007 | Nuspl et al. | |
| 2008/0280141 A1* | 11/2008 | Dobbs et al. | 428/403 |
| 2009/0155689 A1* | 6/2009 | Zaghib et al. | 429/221 |
| 2009/0305132 A1 | 12/2009 | Gauthier et al. | |
| 2010/0297496 A1 | 11/2010 | Ravet et al. | |
| 2010/0327223 A1 | 12/2010 | Zaghib et al. | |

FOREIGN PATENT DOCUMENTS

| | | |
|---|---|---|
| CA | 2 307 119 | 10/2000 |
| CA | 2 614 634 | 6/2009 |
| JP | 2007-230784 | * 9/2007 |
| WO | WO 02/27823 | 4/2002 |

(Continued)

OTHER PUBLICATIONS

Tomasi et a., "Characterization of high-energy milled alumina powders", Ceramica, vol. 44, n.289, Sao Paulo Sep./Oct. 1998, ISSN 0366-6913.*

(Continued)

*Primary Examiner* — Khanh Tuan Nguyen

(57) ABSTRACT

A process for preparing a formulation comprising a carbon-deposited lithium metal phosphate, as precursor of a lithium ion battery electrode coating slurry.

22 Claims, 5 Drawing Sheets

FOREIGN PATENT DOCUMENTS

| WO | WO 02/27824 | 4/2002 |
| WO | WO 2008/062111 | 5/2008 |
| WO | WO 2009/127672 | 10/2009 |
| WO | WO 2011/072397 | 6/2011 |

OTHER PUBLICATIONS

Ciftcioglu et al., "Measurement of Agglomerate Strength Distributions in Agglomerated Powers" American Ceramics Society Bulletin, (1986), vol. 65, No. 12, pp. 1591-1596.

Dominko et al., "Impact of the Carbon Coating Thickness on the Electrochemical Performance of $LiFePO_4$/C Composites" Journal of the Electrochemical Society, (2005), vol. 152, No. 3, pp. A607-A610.

Maier et al., "Defebt Chemistry of $LiFePO_4$" Journal of the Electrochemical Society, (2008), vol. 155, No. 4, pp. A339-A344.

Tomasi et al., "Characterization of High-Energy Milled Alumina Powers" Cerâmica, (1998), vol. 44, No. 289, pp. 1-10.

Wagemaker et al., "Proof of Supervalent Doping in Olivine $LiFePO_4$" Chemistry of Materials, (2008), vol. 20, No. 20, pp. 6313-6315.

International Search Report (Form PCT/ISA/210) and the Written Opinion of the international Searching Authority (From PCT/ISA/237) dated Sep. 29, 2011, issued in the corresponding International Application No. PCT/CA2011/000811.

* cited by examiner

Fig. 2. Particle size distribution curves for six different yttria powders before treatment and after exposure to an ultrasonic breaking pressure of 76 MPa: (A) powder C; (B) powder F; (C) powder A; (D) powder D; (E) powder B; (F) powder E.

US 8,486,296 B2

BATTERY GRADE CATHODE COATING FORMULATION

CROSS-REFERENCE TO RELATED APPLICATION

This application claims the benefit of U.S. Provisional Application 61/364,492 filed Jul. 15, 2010, the contents of which are herein incorporated by reference in their entirety.

BACKGROUND OF THE INVENTION

1. Field of the Invention

The present invention relates to the field of electrode materials, and more specifically, to a process for preparing a formulation comprising a carbon-deposited alkali metal oxyanion, as precursor of lithium-ion battery electrode coating slurry.

2. Description of the Related Art

Some alkali metal oxyanions, useful as cathode material, exhibit undesirably low electronic conductivity. One significant improvement to the problem of low electronic conductivity of some of these alkali metal oxyanion material, for instance of alkali metal phosphate, has been achieved with the formation of a carbon deposit on the surface of the material. Ravet has proposed using an organic carbon precursor that is pyrolysed onto the cathode material or its precursors, thus forming a carbon deposit, to improve electrical field at the level of the cathode particles. [See, e.g., U.S. Pat. No. 6,855,273, U.S. Pat. No. 6,962,666, U.S. Pat. No. 7,344,659, U.S. Pat. No. 7,815,819, U.S. Pat. No. 7,285,260, U.S. Pat. No. 7,457,018, U.S. Pat. No. 7,601,318, WO 2011/072397, WO 02/27823 and WO 02/27824)].

A milling step is generally used following the synthesis of an alkali metal oxyanion material to adjust the particle size distribution of the material in the range necessary for preparation of lithium-ion battery cathode. Nuspl (US 2007/0054187) has proposed a milling step using a rotor mill after carbon-deposition on $LiFePO_4$ produced by a wet process, whereas Ravet (WO 08/062111) has proposed a milling step using a jet mill after solid-state synthesis, in a rotary oven, of C—$LiFePO_4$ from precursors including an organic precursor as carbon-deposit source.

In the specific case of lithium iron phosphate, the quality of $LiFePO_4$ carrying a deposit of carbon (C—$LiFePO_4$) can deteriorate during exposure to air or during handling or storage [See, e.g. Ravet (WO 08/062111)]. This results in a detrimental change in the product or in the formation of impurities, which can subsequently exert a harmful effect on the cycling performance of the battery comprising the phosphate. Controlling the atmosphere around the product during handling, storage and use has been proposed for solving this problem.

The implementation of this process at an industrial scale presents some challenges as the properties of the end product may vary significantly from one batch to another, for instance depending on the nature of the precursors and/or of the product prior to the milling step.

SUMMARY OF THE INVENTION

In one broad non-limiting aspect, the invention relates to a process for preparing a carbon-deposited alkali metal oxyanion electrode material, the process comprising a milling step of carbon-deposited alkali metal oxyanion in the form of strong agglomerates wherein the milling is performed in the presence of solvent used for lithium-ion battery electrode coating.

Strong agglomerates are known structures in the art of ceramics and have been described e.g. in Tomasi et al., Cerámica vol. 44 n. 289 São Paulo September/October 1998, the content of which is hereby incorporated by reference and which shows the effect of high-energy milling on the agglomeration state of powders. Strength of agglomerates may be characterized by methods such as compaction, or ultrasonic dispersion. Characterization of yttria powders agglomerates strength by ultrasonic dispersion has been described e.g. in Am. Cer. Soc. Bull., 65, 1591, 1986.

In another further aspect, the invention relates to a process for preparing a formulation used as battery grade electrode coating precursor, comprising a milling step of at least one carbon-deposited alkali metal oxyanion in the form of strong agglomerates, characterized in that the milling step is performed in the presence of a solvent or a mixture of solvents used for battery electrode coating.

In one non-limiting embodiment, the formulation comprises N-methylpyrrolidone or water as solvent.

In another non-limiting embodiment, the formulation comprises reactive surface treatment chemicals behaving as passivating agent onto fresh surface created during milling.

In another non-limiting embodiment, the formulation comprises at least one electronic conductive additive and/or at least one binder.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1:
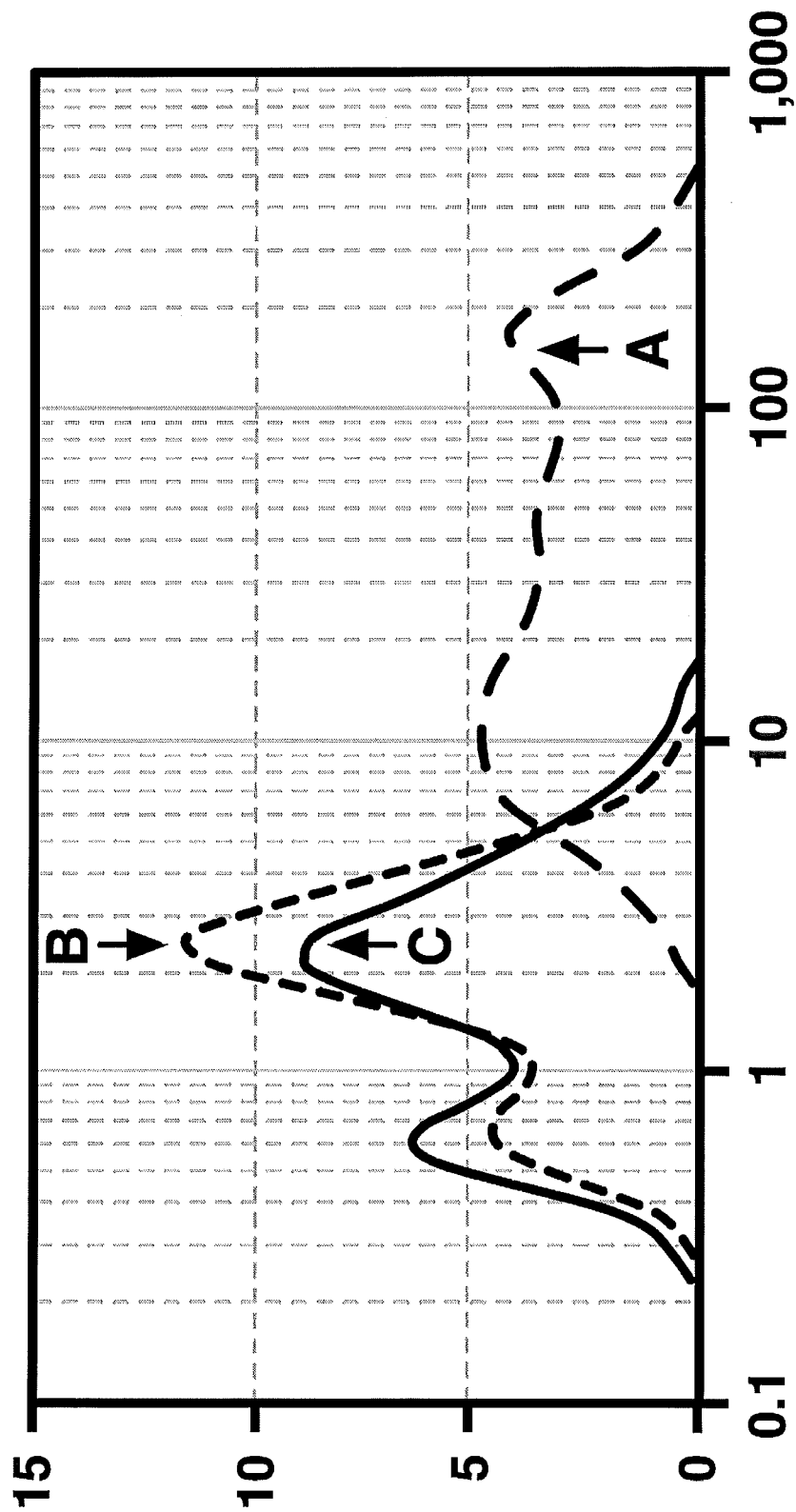
FIG. 1 represents the particle size distribution of as-synthesized C—$LiFePO_4$ in the form of strong agglomerates (Curve A) as prepared in example 1, of as-synthesized C—$LiFePO_4$ strong agglomerates after jet milling (Curve B), and of as-synthesized C—$LiFePO_4$ strong agglomerates after ball milling in N-methylpyrrolidone (Curve C), both jet milled and ball milled C—$LiFePO_4$ as prepared in example 3.

DESCRIPTION OF ILLUSTRATIVE
EMBODIMENTS

The inventors have discovered that a carbon-deposited LiFePO$_4$ (C—LiFePO$_4$) obtained using similar conditions as those reported for a "solid-state process" using large micron-sized precursors in the form of strong agglomerates (high-energy ball milled FePO$_4$.2H$_2$O, Li$_2$CO$_3$ and organic carbon precursor), i.e. the same chemical reactants, atmosphere, rotary oven and identical jet milling condition, surprisingly and unexpectedly, presented after jet milling deteriorated properties characterized by an important electrochemical capacity decrease during galvanostatic cycling, which is incompatible with performance expectation of battery grade product.

In one broad aspect, the invention relates to a process for preparing a formulation comprising a carbon-deposited alkali metal oxyanion, as precursor of lithium-ion battery electrode coating slurry.

In another aspect, the invention relates to a process for preparing a carbon-deposited alkali metal oxyanion electrode material, the process comprising a milling step of carbon-deposited alkali metal oxyanion in the form of strong agglomerates directly in a formulation used as precursor for lithium-ion battery electrode coating.

In another further aspect, the invention relates to a process for preparing a formulation used as battery grade electrode coating precursor, comprising a wet-milling step of at least one carbon-deposited alkali metal oxyanion in the form of strong agglomerates, characterized in that the milling is performed in the formulation and that the formulation comprises a solvent or a mixture of solvents used for battery electrode coating.

In another further aspect, the invention relates to a process for preparing a battery grade formulation comprising a carbon deposited alkali metal phosphate, comprising a milling step of the carbon deposited alkali metal phosphate C-A$_a$M$_m$(XO$_4$)$_x$ in the form of strong agglomerates: wherein C-A$_a$M$_m$(XO$_4$)$_x$ is composed of particles of a compound corresponding to the general formula A$_a$M$_m$(XO$_4$)$_x$ which have an olivine structure and which carry, on at least a portion of their surface, a film of carbon deposited by pyrolysis, the general formula A$_a$M$_m$(XO$_4$)$_x$ being such that: A represents Li, alone or partially replaced by at most 20% as atoms of Na and/or K; M comprise at least 50% at. of Fe(II) or Mn(II) or mixture thereof; and XO$_4$ represents PO$_4$, alone or partially replaced by at most 30 mol % of at least one group chosen from SO$_4$ and SiO$_4$; wherein said milling step is performed in the presence of a solvent used for battery electrode coating.

In a non-limiting embodiment, the carbon-deposited alkali metal oxyanion in the form of strong agglomerates is obtained by a process comprising a high-energy ball milling of precursors.

In a non-limiting embodiment, the carbon-deposited alkali metal oxyanion in the form of strong agglomerates of the present invention comprises particles of a compound corresponding to the general nominal formula A$_a$M$_m$(XO$_4$)$_x$ which has an olivine structure, and which carry, on at least a portion of their surface, a film of carbon deposited by pyrolysis, the formula A$_a$M$_m$(XO$_4$)$_x$ being such that:

A represents Li, alone or partially replaced by at most 20% as atoms of Na and/or K, and $0<a\leq8$;

M comprise at least 50% at. of Fe(II), or Mn(II), or a mixture thereof, and $1\leq m\leq3$; and XO$_4$ represents PO$_4$, alone or partially replaced by at most 30 mol % of SO$_4$ or SiO$_4$, and $0<x\leq3$; and wherein M, X, a, m and x are selected as to maintain electroneutrality of said compound.

In another non-limiting embodiment, the carbon-deposited alkali metal oxyanion of the present invention comprises particles of a compound corresponding to the general nominal formula A$_a$M$_m$(XO$_4$)$_x$ which has an olivine structure, and which carry, on at least a portion of their surface, a film of carbon deposited by pyrolysis, the formula A$_a$M$_m$(XO$_4$)$_x$ being such that:

A represents Li, alone or partially replaced by at most 10% as atoms of Na or K, and $0<a\leq8$;

M is selected from the group consisting of Fe(II), Mn(II), and mixture thereof, alone or partially replaced by at most 50% as atoms of one or more other metals selected from Ni and Co, and/or by at most 20% as atoms of one or more aliovalent or isovalent metals other than Ni or Co, and/or by at most 5% as atoms of Fe(III), and $1\leq m\leq3$; and XO$_4$ represents PO$_4$, alone or partially replaced by at most 10 mol % of at least one group chosen from SO$_4$ and SiO$_4$, and $0<x\leq3$; and wherein M, X, a, m and x are selected as to maintain electroneutrality of said compound.

In yet another non-limiting embodiment, the carbon-deposited alkali metal oxyanion of the present invention comprises particles of a compound corresponding to the general nominal formula A$_a$M$_m$(XO$_4$)$_x$ which has an olivine structure, and which carry, on at least a portion of their surface, a film of carbon deposited by pyrolysis, the formula A$_a$M$_m$(XO$_4$)$_x$ being such that:

A represents Li, alone or partially replaced by at most 10% as atoms of Na or K, and $0<a\leq8$;

M is selected from the group consisting of Fe(II), Mn(II), and mixture thereof, alone or partially replaced by at most 50% as atoms of one or more other metals chosen from Ni and Co, and/or by at most 15% as atoms of one or more aliovalent or isovalent metals selected from the group consisting of Mg, Mo, Nb, Ti, Al, Ta, Ge, La, Y, Yb, Cu, Sm, Ce, Hf, Cr, Zr, Bi, Zn, Ca, B and W, and/or by at most 5% as atoms of Fe(III); and $1\leq m\leq3$; and XO$_4$ represents PO$_4$, alone or partially replaced by at most 10 mol % of SO$_4$ or SiO$_4$, and $0<x\leq3$; and wherein M, X, a, m and x are selected as to maintain electroneutrality of said compound.

In yet a further non-limiting embodiment, the carbon-deposited alkali metal oxyanion of the present invention comprises particles of a compound corresponding to the general nominal formula A$_a$M$_m$(XO$_4$)$_x$ which has an olivine structure, and which carry, on at least a portion of their surface, a film of carbon deposited by pyrolysis, the formula A$_a$M$_m$(XO$_4$)$_x$ being such that:

A represents Li, alone or partially replaced by at most 10% as atoms of Na or K, and $0<a\leq8$;

M is selected from the group consisting of Fe(II), Mn(II), and mixture thereof, alone or partially replaced by at most 10% as atoms of one or more other metals chosen from Ni and Co, and/or by at most 10% as atoms of one or more aliovalent or isovalent metals selected from the group consisting of Mg, Mo, Nb, Ti, Al, Ta, Ge, La, Y, Yb, Cu, Sm, Ce, Hf, Cr, Zr, Bi, Zn, Ca, B and W, and/or by at most 5% as atoms of Fe(III); and $1 \leq m \leq 3$; and $XO_4$ represents $PO_4$, alone or partially replaced by at most 10 mol % of at least one group chosen from $SO_4$ and $SiO_4$, and $0 < x \leq 3$; and
wherein M, X, a, m and x are selected as to maintain electroneutrality of said compound.

In another yet non-limiting embodiment, the carbon-deposited alkali metal oxyanion of the present invention comprises particles of a compound corresponding to the general nominal formula $LiMPO_4$ which has an olivine structure, and which carry, on at least a portion of their surface, a film of carbon deposited by pyrolysis, is M comprising at least 50% at., preferably at least 80% at., more preferably at least 90% at. of Fe(II), or Mn(II), or a mixture thereof.

In another yet further non-limiting embodiment, the carbon-deposited alkali metal oxyanion of the present invention comprises particles of a compound corresponding to the general nominal formula $LiMPO_4$ which has an olivine structure, and which carry, on at least a portion of their surface, a film of carbon deposited by pyrolysis, M comprising at least 65% at. of Mn(II) and at least 25% at. of Fe(II).

In another yet further non-limiting embodiment, the carbon-deposited alkali metal oxyanion of the present invention comprises particles of a compound corresponding to the general nominal formula $LiFePO_4$ which has an olivine structure and which carry, on at least a portion of their surface, a film of carbon deposited by pyrolysis.

By "general nominal formula" one means that the stoichiometry of the material of the invention can vary by a few percents from stoichiometry due to substitution or other defects present in the structure, including anti-sites structural defects such as, without any limitation, cation disorder between iron and lithium in $LiFePO_4$ crystal, see for example Maier et al. [Defect Chemistry of $LiFePO_4$, Journal of the Electrochemical Society, 155, 4, A339-A344, 2008] and Nazar et al. [Proof of Supervalent Doping in Olivine $LiFePO_4$, Chemistry of Materials, 2008, 20 (20), 6313-6315].

In a non-limiting embodiment, the carbon deposit is in the form of an adherent and non-powdery carbon deposit and is present as a more or less uniform deposit. The carbon deposit is present on at least part of the surface of the alkali metal oxyanion. In one non-limiting embodiment, the carbon deposit represents up to 15% by weight, preferably from 0.5 to 5% by weight, most preferably from 1 to 3% by weight, with respect to the total weight of the material. Deposition of carbon by pyrolysis of an organic carbon precursor can be performed on complex metal oxyanion, in particular $A_aM_m(XO_4)_x$ or its precursors as described, for instance, in WO 02/027824, WO 02/027823, CA 2,307,119, WO 2011/072397, US 2002/195591 and US 2004/157126. Methods to produce $A_aM_m(XO_4)_x$ and/or $C-A_aM_m(XO_4)_x$ compounds are well known. They can be obtained, for example, via a hydrothermal route (See U.S. Pat. No. 7,807,121), via a solid-state thermal route (See U.S. Pat. No. 5,910,382, CA 2,307,119, WO 02/027823 and WO 02/027824) via a sol-gel route (See Dominko et al. [Impact of the carbon coating thickness on the electrochemical performance of $LiFePO_4/C$ composites, Journal of the Electrochemical Society, 152, 3, A607-A610, 2005]) or via a melt route (See U.S. Pat. No. 7,534,408).

Wet-milling of the battery grade electrode coating formulation comprising $C-A_aM_m(XO_4)_x$ in the form of strong agglomerates and solvent or mixture of solvents used for battery electrode coating, can be performed with a large choice of equipments, for example without any limitation, colloid mills (e.g. ball mills, bead mills), disc mills, planetary ball mills, stirred ball mills, mixer mills, vibration mills, rotor-stator mixers, high-pressure homogenizers, sand mills, pebble mills, jar mills, submersible media mills (for example Netzsch PSM submersible basket mills), ultrasonic and ultrasonic-assisted milling, and equivalent milling equipments, the person skill in the art is able to identify suitable equipments without undue experimentation and without departing from the present invention.

In a broad non-limiting implementation, the milling equipment is selected so as to avoid contamination of the formulation, in particular to avoid metallic contamination. In view to perform metal-free grinding, the milling part of the equipment is preferably made of ceramics, for example, without any limitation, alumina, zirconium silicate, zirconia, yttria or ceria stabilized zirconia, silicium nitride, tungsten carbide or silicium carbide.

In a non-limiting embodiment, the milling is performed under an inert atmosphere or vacuum.

In a non-limiting example of implementation, the milling time may be set between about 30 min to about 5 hours, preferably between about 1 and about 3 hours, more preferably about 2 hours.

Milling of the battery grade electrode coating formulation comprising $C-A_aM_m(XO_4)_x$ in the form of strong agglomerates is performed in the presence of solvent or mixture of solvents used for battery electrode coating. In one non-limiting embodiment, it is possible to use water or an organic solvent and mixture thereof, commonly used in battery industry for electrode coating. The organic solvent as a solvent comprised in formulation is not limited to one kind, and it may be a blended solvent, by a plurality of kinds of organic solvent. Specifically, it is exemplified that aliphatic hydrocarbons such as n-octane, isooctane, nonane, decane, decalin, pinene, chlorododecane; cycloaliphatic hydrocarbons such as cyclopentane, cyclo-hexane, cycloheptane, methylcyclopentane; aromatic hydrocarbons such as toluene, styrene, chlorobenzene, chlorotoluene, ethylbenzene, diisopropylbenzene, cumene; alcohols such as methanol, ethanol, propanol, isopropanol, butanol, benzyl alcohol, glycerin; ketones such as acetone, methylethylketone, cyclopentanone, isophorone; ethers such as methylethylether, diethyl ether, methyl tert-butyl ether, cyclohexyl alkyl ether, tetrahydrofuran, dioxane; lactones such as γ-butyrolactone, δ-butyrolactone; lactams such as N-methylpyrrolidone, β-lactam; amides such as dim-ethylformamide, dimethylacetamide; compounds containing nitrile group such as methylenecyanohydrin, ethylenecyanohydrin, 3,3'-thiodipropionitrile, acetonitrile; nitrogen-containing heterocycle compounds such as pyridine, pyrrole; glycols such as ethyleneglycol, propyleneglycol; diethyl-eneglycols such as diethyleneglycol, diethyleneglycolmono-ethylether, diethyleneglycolethylbutylether; esters such as methyl formate, ethyl formate, ethyl lactate, propyl lactate, methyl benzoate, methyl acetate, and methyl acrylate can be used. In addition, mixture of lacquer, gasoline, naphtha, kerosene can be used.

In one non-limiting embodiment the milling step is performed in the presence of at least 50% by volume of water.

In another non-limiting embodiment the milling step is performed in water.

In a further non-limiting embodiment the milling step is performed in the presence of at least 50% by volume of N-methylpyrrolidone.

In a yet further non-limiting embodiment the milling step is performed in N-methylpyrrolidone.

In another non-limiting embodiment, the formulation comprises at least one electronic conductive additive and/or at least one binder, where the role of the electronic conductive additive is to ensure electrode coating electronic conduction and the role of the binder is to ensure cohesion of cathode material.

As a binder, it is possible to use a resin material that could be used as a binder for the layer of the positive electrode active material for lithium secondary cell, and examples thereof include polyvinylidene fluoride (PVdF) and derivatives, polymers comprising at least hexafluoropropylene (HFP) and vinylidene fluoride ($VF_2$) monomers, polytetrafluoroethylene, polyvinyl chloride, polyvinylpyrrolidone, styrene-butadiene rubber (SBR), polymethylmethacrylate (PMMA), carboxymethyl-cellulose and derivatives, latex, silicone and derivatives, polyethylene oxide (PEO) and derivatives of all those polymers, and mixtures thereof. Among these, polyvinylidene fluoride and derivatives, including polymers comprising at least HFP and $VF_2$ monomers, are preferably used for lithium-ion battery, PEO and derivatives are preferably used for lithium metal polymer battery. A binder could also comprise a mineral binder, such as metallic polysilicate (as disclosed in U.S. Pat. No. 5,580,686), vitreous or partly vitreous mineral such as binder comprising a phosphate, a polyphosphate, a borate, or a polyborate of an alkaline metal such as lithium or potassium (as disclosed in U.S. Pat. No. 6,844,114), a particularly preferred embodiment comprises the use of a lithium polyphosphate of general formula $(LiPO_3)_n$.

As an electronic conductive additive, it is possible to use a known conductive agent routinely used for secondary lithium cell in, without any limitation, spherical (granular) form, flaky form, a fibrous form and the like, and examples thereof include carbon black, graphite, carbon fiber, carbon nanotube, carbon nanofiber, graphene, vapor growth conductive fiber (VGCF) and mixtures thereof.

In the specific case of a battery that uses a polyether based polymer electrolyte, in particular a lithium metal polymer battery (LMP), a polymeric binder could act also as the milling solvent, especially when processed by extrusion. Mention may in particular be made, without any limitation, as examples of polyethers which can be used in the context of the present invention, of the copolymers which are obtained from ethylene oxide and from at least one substituted oxirane and which comprise at least 70% of —$CH_2$—$CH_2$O— repeat units derived from ethylene oxide.

The repeat units derived from a substituted oxirane can be —O—$CH_2$—CHR-units (derived from an oxirane —$CH_2$—CHR—O—) in which R is an alkyl radical preferably chosen from alkyl radicals having from 1 to 16 carbon atoms, more preferably from alkyl radicals having from 1 to 8 carbon atoms.

The repeat units derived from a substituted oxirane can in addition be —O—$CH_2$CHR'-units (derived from an oxirane —$CH_2$—CHR'—O—) in which R' is a group capable of polymerizing by the radical route. Such a group can be chosen from those which comprise a double bond, for example a vinyl, vinylether, allyl, vinylbenzyl or acryloyl group. Mention may be made, as examples of such groups, of the groups which correspond to the formula $CH_2$=CH—$(CH_2)_q$—(O—$CH_2)_p$— with $1 \leq q \leq 6$ and p=0 or 1, or to the formula $CH_3$—$(CH_2)_y$—CH=CH—$(CH_2)_x$—$(OCH_2)_p$—, with $0 < x+y < 5$ and p=0 or 1.

A polyether of use in the present invention may comprise repeat units derived from several substituted oxiranes.

The formulation could also comprise a lithium salt soluble in polyether based polymer. The lithium salt can be chosen in particular from $LiPF_6$, $LiAsF_6$, $LiClO_4$, $LiBF_4$, Lithium bis (oxalato)borate, Lithium difluoro(oxalato)borate, $Li(C_2F_5SO_2)_2N$, $Li[(C_2F_5)_3PF_3]$, $LiCF_3SO_3$, $LiN(SO_2F)_2$, $LiN(SO_2C_4F_9)(SO_2F)$, and $LiN(SO_2CF_3)_2$.

In the specific case of a battery that uses a polyether based polymer electrolyte, in particular a lithium metal polymer battery (LMP), the milling solvent could comprise polymerizable precursors of polyether based polymer electrolyte in the form of liquid polymers and/or oligomers, either when a polymeric binder acts also as a solvent in the wet-milling step in particular when processed by extrusion, or is part of a milling formulation with an organic solvent.

Without being bound to any theory, the inventors believe that the damage to a carbon-deposited alkali metal oxyanion, e.g. C-$A_aM_m(XO_4)_x$, in the form of strong is agglomerates during a jet milling step, for instance as disclosed in example 3, can be the result of various chemical processes. One possible mechanism, without implied limitation, is the formation of many fresh and highly reactive surfaces, concomitant to material fracturation, during the milling step with a detrimental effect on electrochemical properties, including subsequent storage and handling.

In the context of the present invention, the person skilled in the art will understand that the synthesis of carbon-deposited alkali metal oxyanion, e.g. C-$A_aM_m(XO_4)_x$, in the form of strong agglomerates, is not limited to a process comprising a high-energy ball milling step as disclosed in example 1 or 2. The present invention is not limited to any specific mechanisms, and those skilled in the art are able to understand the benefits of the present invention for various carbon-deposited alkali metal oxyanion, e.g. C-$A_aM_m(XO_4)_x$, in the form of strong agglomerates, independently of their production processes (precipitation, solid-state, hydrothermal, sol-gel, etc.).

In one further non-limiting embodiment, before the milling step of the present invention, the carbon-deposited alkali metal oxyanion of the invention is in the form of strong agglomerates of submicron particles which have a $D_{50}$ size which is between 10 nm and 500 nm, preferably between 50 nm and 300 nm, more preferably between 100 nm and 200 nm.

In accordance with a specific implementation before the milling step of the present invention, the C-$A_aM_m(XO_4)_x$ material is in the form of strong agglomerates having a particle size distribution of $D_{90} \geq 50$ µm, preferably a $D_{90} \geq 100$ µm, even more preferably a $D_{90} \geq 150$ µm.

In accordance with another specific implementation, after the milling step of the present invention, the C-$A_aM_m(XO_4)_x$ material may be composed of both individual particles and/or agglomerates of individual particles. The size of the individual particles is preferably between 10 nm and 3 µm. The size of the agglomerates is preferably between 100 nm and 30 µm.

In accordance with yet another specific implementation, after the milling step of the present invention, the C-$A_aM_m(XO_4)_x$ material is composed of secondary particles with a 0.5 µm $\leq D_{50} \leq$ 10 µm.

In accordance with a further specific implementation, after the milling step of the present invention, the C-$A_aM_m(XO_4)_x$ material is composed of secondary particles with a $D_{90} \leq 30$ µm.

In accordance with a yet further specific implementation, after the milling step of the present invention, the C-$A_aM_m(XO_4)_x$ is in particulate form or agglomerate of nanoscaled particles, and the deposit of carbon on C-$A_aM_m(XO_4)_x$ is deposited on the surface of the particles or inside agglomerates of the nanoscaled particles.

In one non-limiting embodiment, the process of the present invention is operated on mixture of different grades of C-$A_aM_m(XO_4)_x$, such as materials with different particle size distributions, for example, without any limitation mixtures comprising at least one submicron-sized C-$A_aM_m(XO_4)_x$ and at least one micron-sized C-$A_aM_m(XO_4)_x$. [See, e.g. US 2010/0327223]. Such mixtures may allow cathode optimization in terms of energy and power density.

In another non-limiting embodiment, the process of the present invention is operated on mixture of at least one C-$A_aM_m(XO_4)_x$ in the form of strong agglomerates and at least one cathode material with a different chemistry, such as, without any limitation $LiCoO_2$, $LiMn_2O_4$, lithium nickel manganese cobalt oxide, lithium nickel manganese oxide, or lithium nickel cobalt aluminum oxide.

In one non-limiting embodiment, it is also possible to add a surface treatment agent in the formulation, during or after the milling step, behaving as a passivating agent onto fresh and highly reactive surface created during milling, resulting in electrochemical properties improvement. As surface treatment agent, it is possible to use one or more metal alkoxide, such as titanium, zirconium, aluminum, and silicon alkoxides. Specifically, Dorf Ketal offers a broad range of Tyzor® titanate and zirconate products, as a pure chemical or as organic or water-based solution. The person skill in the art is able to identify suitable surface treatment agent without departing from the present invention.

For example, without any limitation, Dorf Tyzor® could be selected among Tyzor® IAM (titanium alkyl phosphate solution), Tyzor® IBAY (titanium ethylacetoacetate), Tyzor® OGT (octylene glycol titanate), Tyzor® PITA (titanium ethylacetoacetate), Tyzor® LA (aqueous titanium lactate solution, Tyzor® NBZ (n-butyl zirconate in alcohol), Tyzor® NPZ (n-propyl zirconate in alcohol), Tyzor® PC—64 (titanium phosphate glycol solution), Tyzor® TEAZ (zirconium triethanolamine complex), Tyzor® TNBT (n-butyl titanate), Tyzor® TOT (2-ethylhexyl titanate), Tyzor® JT-1 (titanium acetylacetonate polymer dispersed in water), Tyzor® TPT (iso-propyl titanate), Tyzor® TE (titanium triethanolamine solution), Tyzor® TEP (triethanolamine titanate in glycol), Tyzor® 212 (zirconate complex), Tyzor® 217 (aqueous zirconium chelate), Tyzor® 223 (zirconate complex), Tyzor® 115 (zirconate complex), Tyzor® 131 (aqueous titanium chelate), Tyzor® NPT (n-propyl titanate), Tyzor® TPT (iso-propyl titanate), Tyzor® PITA-SM (Tyzor PITA solution in silane), Tyzor® BTP (poly-n-butyl titanate), Tyzor® DEA (titanium diethanolamine solution), Tyzor® ET (ethyl titanate), Tyzor® TPT-15B (85:15 blend of Tyzor TPT and TnBT), or Tyzor® TPT-20B (80:20 blend of Tyzor TPT and TnBT).

In one non-limiting aspect, the present invention also relates to the use of surface treatment agent in a formulation used as battery grade electrode coating precursor.

In one non-limiting embodiment, surface treatment agents are selected from titanate, zirconate or silicon alkoxides.

In accordance with a specific implementation, the formulation comprise up to 2% by weight, relatively to C-$A_aM_m(XO_4)_x$ material of the present invention, of the surface treatment agent.

In one non-limiting embodiment, the C-$A_aM_m(XO_4)_x$ material of the present to invention may comprise at its surface or in the bulk, additives, such as, without any limitation, carbon particles, carbon fibers and nanofibers, carbon nanotubes, graphene, metallic oxides, and any mixture thereof.

The invention will now be further illustrated by the following non-limiting examples.

Example 1

Synthesis of C—$LiFePO_4$ Agglomerates 834.91 g as-received $FePO_4.2H_2O$ (sold by Budenheim, grade E53-81), 165.09 g as-received $Li_2CO_3$ (sold by Quadra Chemicals), 25 g stearic acid (sold by Sigma-Aldrich) and 25 g micronized polyethylene wax powders (sold by Marcus Oil & Chemical, grade M 5005, average particle size of 5 µm) were charged in an high-energy ball milling vertical agitation attritor (Union Process 1-S, process vessel size of 7 liters) containing 10 kg of yttrium-stabilized $ZrO_2$ beads (10 mm diameter) as milling media. The attritor was then operated during 2 hours at a speed of 350 rpm, corresponding to a 2 kWh grinding power by kilogram of material being grinded (2 kWh/kg), based on running power of electric motors rotating agitating arms. Strong agglomerates of precursors were obtained after attrition. An experiment has been repeated to produce a 25 kg masterbatch with similar results.

The agglomerates were introduced in a rotary kiln at a feed rate of 10 kg/h and the temperature was gradually raised up to 700° C. at the rate of 6° C. per minute. The temperature was maintained for one hour at 700° C. and then the product was cooled over 40 minutes and then discharged in an airtight container under nitrogen. The kiln was continuously flushed with nitrogen throughout the duration of the thermal treatment. Humid nitrogen gas (bubbled in water at 35-40° C.) was injected in the rotary kiln in the middle of the zone corresponding to the 700° C. 1 hour heat treatment step, as disclosed in WO 2011/072397. As-synthesized C—$LiFePO_4$ exhibits a level of moisture of 300 ppm (determined using a Computrac Vapor Pro L sold by Arizona Instruments LLC), a BET of 9.2 m$^2$/g (determined using a Micromeritics Tristar 3020a), a carbon content of 2.17 wt. % (determined using a LECO apparatus), a tapped density of 1.38 g/cm$^3$ (determined using a Varian apparatus model "tap density"), and a press density of 2.19 g/cm$^3$ (determined by applying a pressure of 40 psi on agglomerates placed in a metallic pellet press).

Particle size distribution of as-synthesized C—$LiFePO_4$, determined with a Microtrac S3500 Particle Size Analyser, is provided in FIG. 1 respectively on curve A.

Figure 2:
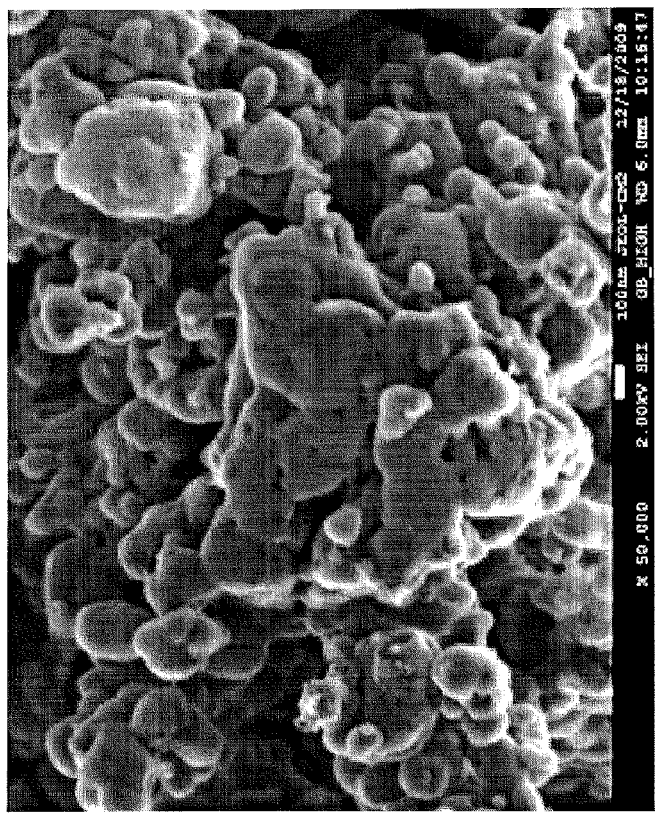
FIG. 2 represents the SEM microscopy observation of as-synthesized C—$LiFePO_4$ of FIG. 1, as prepared in example 1, in the form of large strong agglomerates of submicron lithium iron phosphate having a carbon deposit.
Figure 2:
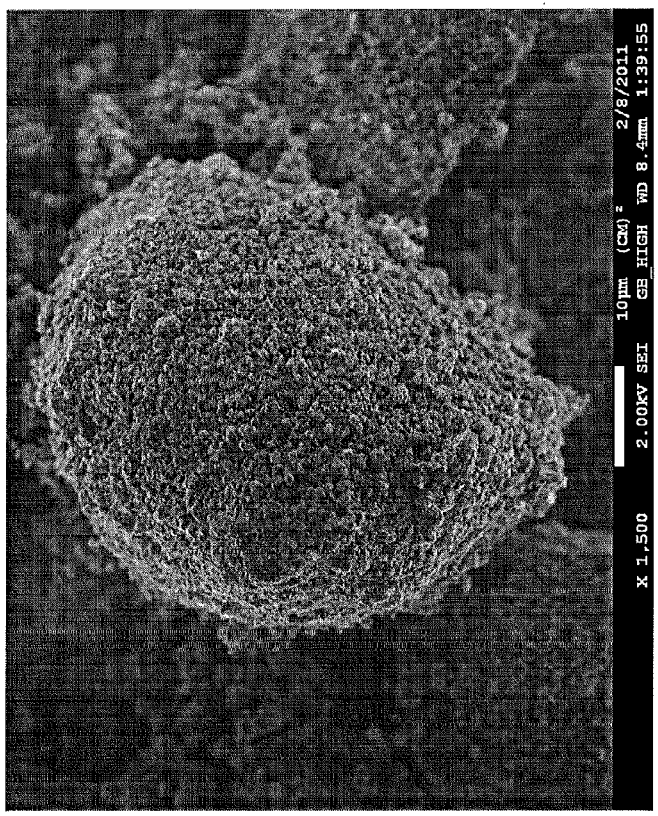

Scanning electron microscopy (SEM) of as-synthesized C—$LiFePO_4$ is provided on FIG. 2, the product is in the form of large strong agglomerates of submicron carbon-deposited lithium iron phosphate.

Figure 3:
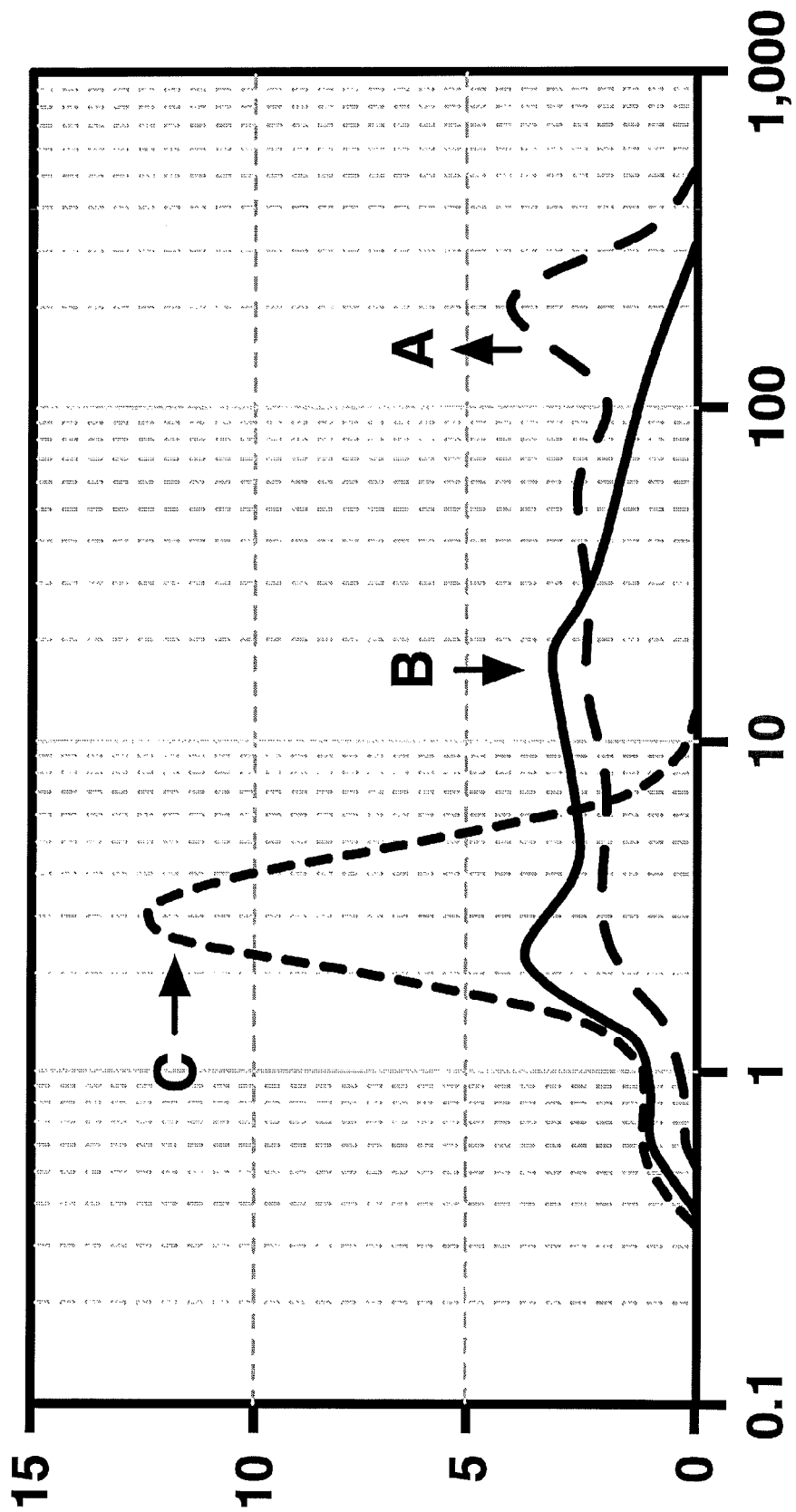
FIG. 3 represents the particle size distribution of as-synthesized C—$LiFePO_4$ agglomerates obtained after milling in Union Process 1-S Attritor® and subsequent heating step, as prepared in example 1 (Curve A), of as-synthesized C—$LiFePO_4$ agglomerates, as prepared in example 1, after a 30 s ultrasonic treatment (Curve B), and of as-synthesized C—$LiFePO_4$ (Life Power® P1 grade) after a 30 s ultrasonic treatment (Curve C). Prior to the ultrasonic treatment the C—$LiFePO_4$ P1 grade, isolated just after the thermal treatment step in a rotary kiln, is in the form of beads having a 5 mm mean particle size as observed by scanning electron microscopy.

Strength of agglomerates of precursors and of as-synthesized C—$LiFePO_4$ has been characterized by adding 0.3 g of powder in a 100 ml beaker, then 3 ml of Triton X-100 followed by 60 ml of deionized water, then applying an ultrasonic dispersion energy for 30 s with a Sonic and Materials VCX 130 ultrasonic generator (power 130 W, frequency 20 kHz) equipped with an ultrasonic tip model CV18. References have been made with agglomerates without ultrasonic treatment. A comparative example has been performed on beads of C—$LiFePO_4$ Life Power® P1 grade (using a simple mixing of precursors in isopropanol followed by drying to obtain beads) obtained just after the thermal step in a rotary kiln in the form of 5 mm mean particle size beads (as observed by SEM). Prior to all PSD measurements, the dispersions are homogenized by agitating at 500 rpm for 20 s. Results are provided in FIG. 3.

In this specification, strong agglomerates are thus defined as agglomerates that when subjected to the ultrasonic dispersion treatment above manifest a reduction of $D_{50}$ of no more than 50-fold, preferably of no more than 30-fold, more preferably of no more than 20-fold, even more preferably of no more than 10-fold.

Example 2

Synthesis of C—$LiFePO_4$ Agglomerates

A mixture comprising 30 kg of $FePO_4.2H_2O$ (sold by Budenheim, grade E53-81) and 1.5 kg of polyethylene-blockpolyethylene glycol) comprising 50% of ethylene oxide (sold by Aldrich) was prepared and wetted by isopropyl alcohol (60 liters), mixing was carried out for approximately 2 hours and then the solvent was removed.

After drying, the mixture was introduced in a rotary kiln and heated up to 500° C. for 2 hours to produce carbon-deposited $Fe_2P_2O_7$ (C—$Fe_2P_2O_7$). The kiln was continuously flushed with nitrogen throughout the duration of the heat treatment.

C—$Fe_2P_2O_7$ (3 moles), as-received $Li_2CO_3$ (3 moles, sold by Quadra Chemicals), and 2 wt. % stearic acid (sold by Sigma-Aldrich) were charged in a high-energy ball milling vertical agitation attritor (Union Process 1-S, process vessel size of 7 liters) containing 10 kg of yttrium-stabilized $ZrO_2$ beads (10 mm diameter) as milling media. The attritor was then operated during 2 hours at a speed of 350 rpm. Strong agglomerates of precursors were obtained after attrition. The experiment was repeated to produce a 20 kg masterbatch with similar results.

The agglomerates were introduced in a rotary kiln at a feed rate of 10 kg/h and heated up to 700° C. at the rate of 6° C. per minute. This temperature was maintained for one hour and then the product was cooled over 40 minutes and then discharged in an airtight container under nitrogen in the form of C—$LiFePO_4$ agglomerates. The kiln was continuously flushed with nitrogen throughout the duration of the heat treatment and humid nitrogen gas (bubbled in water at 35-40° C.) was injected in the rotary kiln in the middle of the zone corresponding to the 700° C. 1 hour heat treatment step.

Example 3

Milling of C—$LiFePO_4$ Agglomerates

A fraction of the C—$LiFePO_4$ agglomerates obtained in example 1 was subjected to jet milling under compressed air at a dew point of −70° C. and then stored under nitrogen ("jet milled").

A fraction of the C—$LiFePO_4$ agglomerates obtained in example 1 was subjected, in a jar mill with zirconia beads, to ball milling in N-methylpyrrolidone during 12 hours ("ball milled").

Particle size distributions of respective jet milled and ball milled C—$LiFePO_4$ agglomerates, determined with a Microtrac S3500 Particle Size Analyser, are provided in FIG. 1 (Curve B for jet milled and Curve C for ball milled).

Example 4

Preparation of Liquid Electrolyte Batteries

Liquid electrolyte batteries were prepared according to the following procedure.

Coating A:

a HFP-$VF_2$ copolymer (Kynar® HSV 900, supplied by Atochem), an EBN-1010 graphite powder (supplied by Superior Graphite) and a jet milled C—$LiFePO_4$, as prepared in example 3, were carefully mixed in N-methylpyrrolidone (NMP) for one hour using zirconia beads in a Turbula® mixer in order to obtain a dispersion composed of the C—$LiFePO_4$/PVdF-HFP/graphite 80/10/10 by weight mixture. The mixture obtained was subsequently deposited, using a Gardner® device, on a sheet of aluminum carrying a carbon-treated coating (supplied by Intellicoat) and the film deposited was dried under vacuum at 80° C. for 24 hours and then stored in a glovebox.

Coating B:

a HFP-$VF_2$ copolymer (Kynar® HSV 900, supplied by Atochem), an EBN-1010 graphite powder (supplied by Superior Graphite) and a ball milled C—$LiFePO_4$/NMP slurry, as prepared in example 3, were carefully mixed for one hour using zirconia beads in a Turbula® mixer in order to obtain a dispersion composed of the C—$LiFePO_4$/PVdF-HFP/graphite 80/10/10 by weight mixture. The mixture obtained was subsequently deposited, using a Gardner® device, on a sheet of aluminum carrying a carbon-treated coating (supplied by Intellicoat) and the film deposited was dried under vacuum at 80° C. for 24 hours and then stored in a glovebox.

Coating C:

a HFP-$VF_2$ copolymer (Kynar® HSV 900, supplied by Atochem), an EBN-1010 graphite powder (supplied by Superior Graphite) and an agglomerated C—$LiFePO_4$, as prepared in example 1, were subjected, in a jar mill with zirconia beads, to ball milling during 12 hours, in order to obtain a dispersion composed of the C—$LiFePO_4$/PVdF-HFP/graphite 80/10/10 by weight mixture. The mixture obtained was subsequently deposited, using a Gardner® device, on a sheet of aluminum carrying a carbon-treated coating (supplied by Intellicoat) and the film deposited was dried under vacuum at 80° C. for 24 hours and then stored in a glovebox.

Batteries of the "button" type were assembled and sealed in a glovebox, use is being made of the carbon-treated sheet of aluminum carrying the coating comprising the material C—$LiFePO_4$, as cathode, a film of lithium, as anode, and a separator having a thickness of 25 μm (supplied by Celgard) impregnated with a 1M solution of $LiPF_6$ in an EC/DEC 3/7 mixture. The capacity of the cathode of the battery expressed in mg of electroactive material C—$LiFePO_4$ per $cm^2$ of the surface of the cathode is comprised between 4.8 and 5 mg/$cm^2$.

Cycling of Batteries

The batteries A (coating A), B (coating B) and C (coating C) were subjected to scanning cyclic voltammetry at ambient temperature with a rate of 20 mV/80 s using a VMP2 multi-channel potentiostat (Biologic Science Instruments), first in oxydation from the rest potential up to 3.6 V and then in reduction between 3.6 and 2 V, this reduction step allowing to determine the capacity C of the battery expressed in mAh/g.

Figure 4:
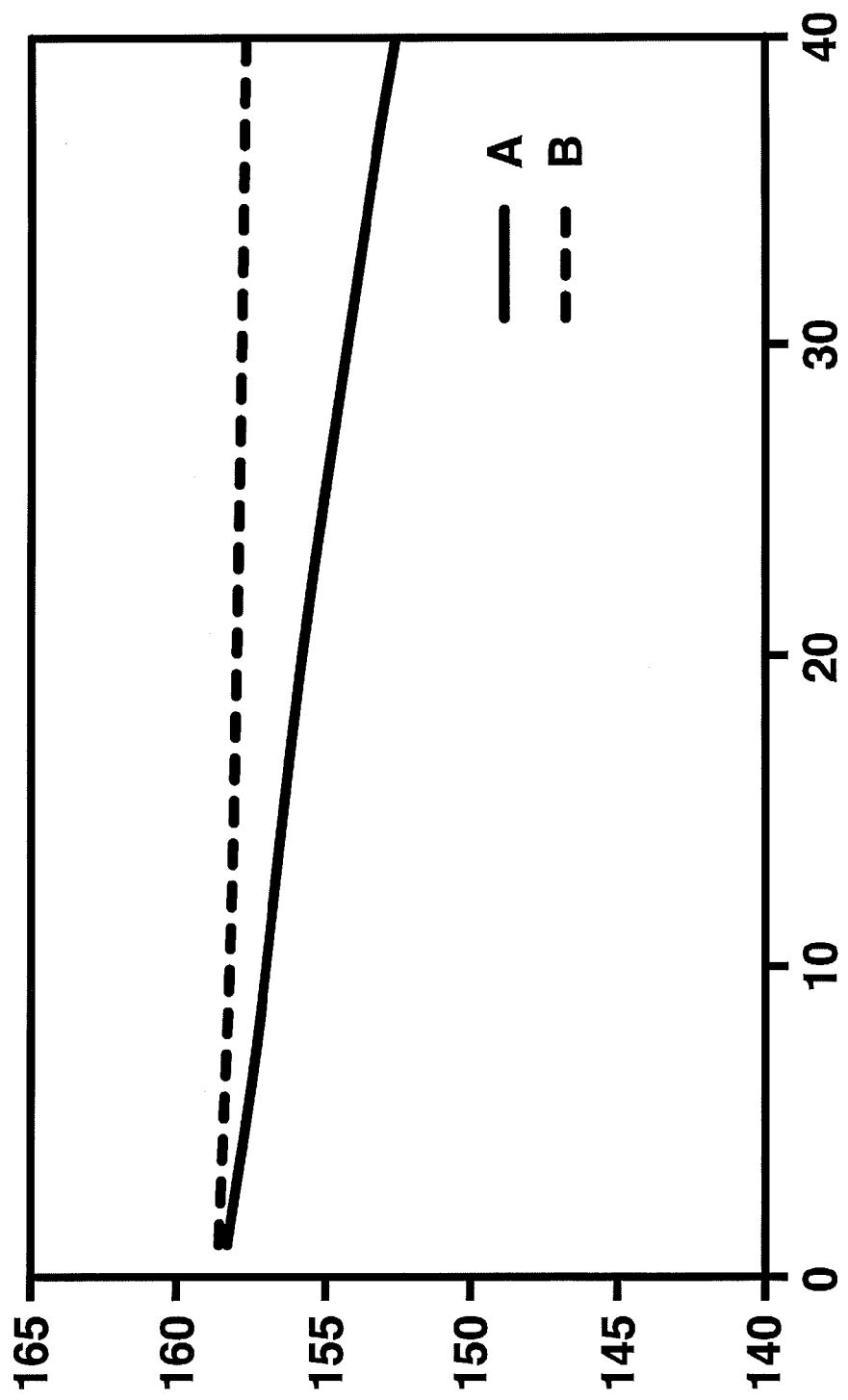
FIG. 4 represents the C/4 galvanostatic cycling curve at 60° C. of two batteries A and B of the Li/1M $LiPF_6$ EC:DEC 3:7/C—$LiFePO_4$ type. The capacity of the battery (in mAh per g of C—$LiFePO_4$) is indicated on the ordinate and the number of cycles is shown on the abscissa. The positive electrode of the battery B was prepared from a material C—LiFePO$_4$, as prepared in example 3, milled directly in cathode coating formulation. The positive electrode of the battery A was prepared from a material C—LiFePO$_4$, as prepared in example 3, jet milled after synthesis.
Figure 5:
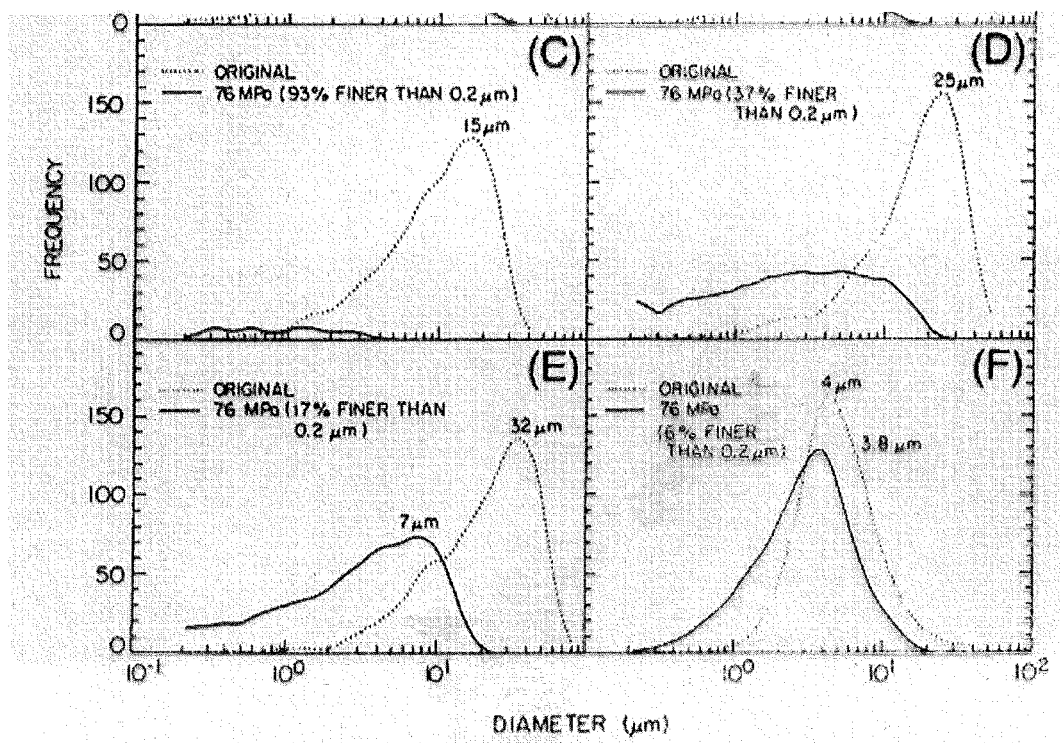
FIG. 5 is an illustrative figure an article Am. Cer. Soc. Bull., 65, 1591, 1986, which provides a characterization of yttria powders agglomerates strength by ultrasonic dispersion.

The batteries A, B and C were then subjected to C/4 galvanostatic cycling at 60° C. between 2 and 3.6 Volt. The curves for batteries A and B are represented in FIG. 4, the curve for battery C is identical to battery B. The results confirm that the process of the invention allows the preparation of battery grade C—$LiFePO_4$.

C—$LiFePO_4$ in the form of strong agglomerates has also been obtained by a sol-gel process, the starting material were $LiH_2PO_4$, iron citrate and 5 wt. % (relatively to $LiH_2PO_4$ and iron citrate) of hydroxyethylcellulose in water, after heating for 2 hours at 70° C. under agitation and evaporation of solvent, gel was heated under humid atmosphere as disclosed in WO 2011/072397 to obtained C—$LiFePO_4$ in the form of strong agglomerates. Those strong agglomerates have been processed as in example 3 and qualify in batteries as in example 4, confirming to benefits of milling process of present invention to improve electrochemical performances.

Formulation for coating B and C have been repeated with addition of 1 wt. % relatively to C—$LiFePO_4$ of titanium ethoxide (DuPont™ Tyzor® ET) during milling step of agglomerates. After qualification in batteries it appears that capacity fading is at 60° C. has been reduced by about 15% after 40 cycles comparatively to batteries B and C, confirming the benefits of passivation agent addition in the formulation.

Formulation for coating A have been repeated with addition of 1 wt. % relatively to C—LiFePO$_4$ of titanium ethoxide (DuPont™ Tyzor® ET) during preparation of coating formulation. After qualification in batteries it appears that capacity fading at 60° C. has been reduced by about 5% after 40 cycles comparatively to batteries A, confirming the benefits of passivation agent addition battery coating formulation.

The advantageous effect of the invention herein described with C—LiFePO$_4$ has also been confirmed with other carbon-deposited alkali metal oxyanion including, without any limitation, C—LiFe$_{0.65}$Mn$_{0.3}$Mg$_{0.05}$PO$_4$, C—LiMn$_{0.675}$Fe$_{0.275}$Mg$_{0.05}$PO$_4$, C—Li$_{0.9}$Na$_{0.1}$FePO$_4$, C—LiFe$_{0.95}$Al$_{0.05}$(PO$_4$)$_{0.95}$(SiO$_4$)$_{0.05}$ and C—LiFe$_{0.95}$Mg$_{0.05}$PO$_4$, while improving electrochemical performances of those materials.

The advantageous effect of the invention herein described has also been evaluated with other carbon-deposited alkali metal oxyanion including, without any limitation, C—LiFe$_{0.65}$Mn$_{0.3}$Mg$_{0.05}$PO$_4$, C—LiMn$_{0.675}$Fe$_{0.275}$Mg$_{0.05}$PO$_4$, C—Li$_{0.9}$Na$_{0.1}$FePO$_4$, C—LiFe$_{0.95}$Al$_{0.05}$(PO$_4$)$_{0.95}$(SiO$_4$)$_{0.05}$ and C—LiFe$_{0.95}$Mg$_{0.05}$PO$_4$, while improving electrochemical performances of those material.

The above description of the embodiments should not be interpreted in a limiting manner since other variations, modifications and refinements are possible within the spirit and scope of the present invention. The scope of the invention is defined in the appended claims and their equivalents.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

All of the references cited supra and infra herein are hereby incorporated by reference in their entirety.

The invention claimed is:

1. A process for preparing a battery grade formulation comprising a carbon-deposited alkali metal phosphate, said process comprising a milling step of the carbon-deposited alkali metal phosphate C-A$_a$M$_m$(XO$_4$)$_x$ in the form of strong agglomerates, wherein the strong agglomerates are obtained by a process comprising a dry high-energy ball milling of precursors of the carbon-deposited alkali metal phosphate:

wherein C-A$_a$M$_m$(XO$_4$)$_x$ is composed of particles of a compound corresponding to the general formula A$_a$M$_m$(XO$_4$)$_x$ which have an olivine structure and which carry, on at least a portion of their surface, carbon deposited by a thermal process, the general formula A$_a$M$_m$(XO$_4$)$_x$ being such that:

A represents Li, alone or partially replaced by at most 20% as atoms of Na and/or K, and $0 < a \leq 8$;

M comprise at least 50% at, of Fe(II) or Mn(II) or mixture thereof, and $1 \leq m \leq 3$; and XO$_4$ represents PO$_4$, alone or partially replaced by at most 30 mol % of at least one group chosen from SO$_4$ and SiO$_4$, and $0 < x \leq 3$;

wherein M, X, a, m and x are selected as to maintain electroneutrality of said compound; and wherein said milling step is performed in the presence of a solvent used for battery electrode coating.

2. A process as in claim 1, wherein the milling step is performed in the presence of a solvent comprising at least 50% by volume of water or N-methyl-pyrrolidone.

3. A process as in claim 2, wherein the milling step is performed in water.

4. A process as in claim 2, wherein the milling step is performed in N-methylpyrrolidone.

5. A process as in claim 1, wherein the formulation comprises at least one electric conductive additive and/or at least one binder.

6. A process as in claim 5, wherein the electric conductive additive is selected from the group consisting of carbon black, graphite, carbon fiber, carbon nanotube, carbon nanofiber, graphene, vapor growth carbon fiber and metallic oxide.

7. A process as in claim 5, wherein the binder is selected from polymers comprising repeating unit of hexafluoropropylene and/or vinylidene fluoride.

8. A process as in claim 5, wherein the binder is selected from polymers comprising ethylene oxide repeating units.

9. A process as in claim 1, wherein before the milling step, the C-A$_a$M$_m$(XO$_4$)$_x$ has a particle size distribution of $D_{90} \geq 50$ μm.

10. A process as in claim 1, wherein after the milling step, the C-A$_a$M$_m$(XO$_4$)$_x$ has a particle size distribution of $D_{90} \leq 30$ μm.

11. A process as in claim 1, wherein after the milling step, the C-A$_a$M$_m$(XO$_4$)$_x$ is composed of individual particles and/or agglomerates of individual particles.

12. A process as in claim 11, wherein the individual particles are between 10 nm and 3 μm.

13. A process as in claim 11, wherein the agglomerates are between 100 nm and 3 μm.

14. A process as in claim 1, Wherein after the milling step, the C-A$_a$M$_m$(XO$_4$)$_x$ is composed of secondary particles with a $0.5 \text{ μm} \leq D_{50} \leq 10$ μm.

15. A process as in claim 1, wherein the formulation comprises a surface treatment agent.

16. A process as in claim 15, wherein the surface treatment agent is selected from the group consisting of titanium, zirconium and silicon alkoxides.

17. A process as in claim 15, wherein the formulation comprises up to 2% by weight, relatively to C-A$_a$M$_m$(XO$_4$)$_x$, of the surface treatment agent.

18. A process as in claim 1, wherein the formulation comprises at least one submicron-sized C-A$_a$M$_m$(XO$_4$)$_x$ and at least one micron-sized C-A$_a$M$_m$(XO$_4$)$_x$.

19. A process as in claim 1, wherein the C-A$_a$M$_m$(XO$_4$)$_x$ is obtained by a process comprising a thermal treatment of precursors, wherein the precursors comprises FePO$_4$, Li$_2$CO$_3$ and a carbon source.

20. A process as in claim 1, wherein the C-A$_a$M$_m$(XO$_4$)$_x$ is obtained by a process comprising a thermal treatment of precursors, wherein the precursors comprises Fe$_2$P$_2$O$_7$, optionally having a carbon deposit, Li$_2$CO$_3$ and a carbon source.

21. A process as in claim 1, wherein before the milling step, the C-A$_a$M$_m$(XO$_4$)$_x$ has a particle size distribution of $D_{90} \geq 100$ μm.

22. A process as in claim 1, wherein before the milling step, the C-A$_a$M$_m$(XO$_4$)$_x$ has a particle size distribution of $D_{90} \geq 150$ μm.

* * * * *